United States Patent
Yu

(10) Patent No.: US 10,812,671 B2
(45) Date of Patent: Oct. 20, 2020

(54) IMAGE READER

(71) Applicant: BROTHER KOGYO KABUSHIKI KAISHA, Nagoya-shi, Aichi-ken (JP)

(72) Inventor: Lifan Yu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 103 days.

(21) Appl. No.: 16/166,429

(22) Filed: Oct. 22, 2018

(65) Prior Publication Data

US 2019/0132465 A1  May 2, 2019

(30) Foreign Application Priority Data

Oct. 26, 2017  (JP) .................. 2017-206961

(51) Int. Cl.
*H04N 1/00* (2006.01)
*H04N 1/10* (2006.01)
*G06T 7/13* (2017.01)

(52) U.S. Cl.
CPC .......... *H04N 1/00809* (2013.01); *G06T 7/13* (2017.01); *H04N 1/0071* (2013.01); *H04N 1/00748* (2013.01); *H04N 1/00761* (2013.01); *H04N 1/1039* (2013.01); *H04N 1/00814* (2013.01); *H04N 1/00816* (2013.01)

(58) Field of Classification Search
CPC .......... H04N 1/00809; H04N 1/00748; H04N 1/0071; H04N 1/00816
See application file for complete search history.

(56) References Cited

U.S. PATENT DOCUMENTS

2018/0324315 A1* 11/2018 Takamori ........... H04N 1/00551
2019/0124225 A1*  4/2019 Fujii ......................... G06T 7/74

FOREIGN PATENT DOCUMENTS

JP     H09-027909 A    1/1997
JP     2002-142084 A   5/2002

* cited by examiner

*Primary Examiner* — Benjamin O Dulaney
(74) *Attorney, Agent, or Firm* — Scully, Scott, Murphy & Presser, PC

(57) ABSTRACT

An image reader wherein a controller executes: a start process of starting a reading operation; a head edge detection process of detecting a document width; a first side edge detection process of detecting a side edge until an occurrence of a first change from a side edge detecting state to a side edge non-detecting state; a calculation process of calculating a continuation distance based on the document width; a second side edge detection process of detecting the side edge until an occurrence of a second change from the non-detecting state to the detecting state; a third side edge detection process of detecting the side edge until an occurrence of the first change; and an end process of ending the reading operation when the second change does not occur in a continuation range in the second detection process or when the first change occurs in the third detection process.

7 Claims, 13 Drawing Sheets

STORAGE STATE OF FLASH ROM 33

| SPECIFIC SIZE SPS | MAIN SCANNING DISTANCE MDL |
|---|---|
| A4 | 3508 (297mm) |
| A5 | 2480 (210mm) |
| A6 | 1748 (148mm) | icon
IMAGE READER

CROSS REFERENCE TO RELATED APPLICATION

The present application claims priority from Japanese Patent Application No. 2017-206961, which was filed on Oct. 26, 2017, the disclosure of which is herein incorporated by reference in its entirety.

BACKGROUND

Technical Field

The following disclosure relates to an image reader.

Description of Related Art

A known image reader is configured to read a document while moving, in a sub scanning direction, a line sensor extending in a main scanning direction and to compare a maximum value of read data in one line in a main scanning direction with a threshold determined based on a density of a white background color of the document, so as to detect the presence or absence of the document. When no document to read exists in the sub scanning direction, the maximum value of the read data represents not the density of the white background color of the document but a density of a background color other than the white background color of the document. In response to a change from the density of the white background color of the document to the density of the background color other than the white background color of the document, the image reader stops the reading operation of the document.

SUMMARY

In the case where a book document is laid open on a document table of the image reader with the side of the book document to be read facing down, a central bound portion of the opened book document floats away from the document table. In this case, when the image reader described above reads the central bound portion of the book document, the image reader determines that the central bound portion has the density of a background color other than the white background color of the document because the central bound portion of the book document floats away from the document table. Thus, the image reader erroneously determines that no document exists at a position corresponding to the central bound portion of the book document and stops the reading operation of the book document at that position.

Accordingly, one aspect of the present disclosure relates to an image reader configured to appropriately read a document even in reading a book document.

In one aspect of the disclosure, an image reader includes: a document table configured to support a document; a reading device configured to read an image of the document supported by the document table by a line image sensor extending in a main scanning direction and to form read image data including a plurality sets of line image data respectively for a plurality of lines; a moving device configured to move the line image sensor in a sub scanning direction orthogonal to the main scanning direction; and a controller. The controller is configured to execute: a start process of starting a reading operation to form the read image data while moving, by the moving device, the line image sensor downstream in the sub scanning direction; a head edge detection process of detecting, from the read image data, a document width which is a length in the main scanning direction of the document supported by the document table; a first side edge detection process of detecting, from the line image data for each line in the read image data, a side edge which is a side of the document along the sub scanning direction, by successively determining for each of the lines whether the line image data of one line contains data indicative of the side edge until an occurrence of a first change that is a change from a detecting state in which the side edge is detected to a non-detecting state in which the side edge is not detected; a calculation process of calculating a continuation distance based on the document width; a second side edge detection process of detecting the side edge from the line image data for each line in the read image data after the side edge is detected in the first side edge detection process, by successively determining for each of the lines whether the line image data of one line contains data indicative of the side edge until an occurrence of a second change that is a change from the non-detecting state to the detecting state in a continuation range ranging from a first position in the sub scanning direction at which the first change occurs in the first side edge detection process to a position distant from the first position downstream in the sub scanning direction by the continuation distance; a third side edge detection process of detecting the side edge from the line image data for each line in the read image data when the second change occurs in the second side edge detection process, by successively determining for each of the lines whether the line image data of one line contains data indicative of the side edge from a second position in the sub scanning direction at which the second change occurs in the second side edge detection process until an occurrence of the first change; and an end process of ending the reading operation when the second change does not occur in the continuation range in the second side edge detection process or when the first change occurs in the third side edge detection process.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Configuration of Image Reader SM

Figure 1:
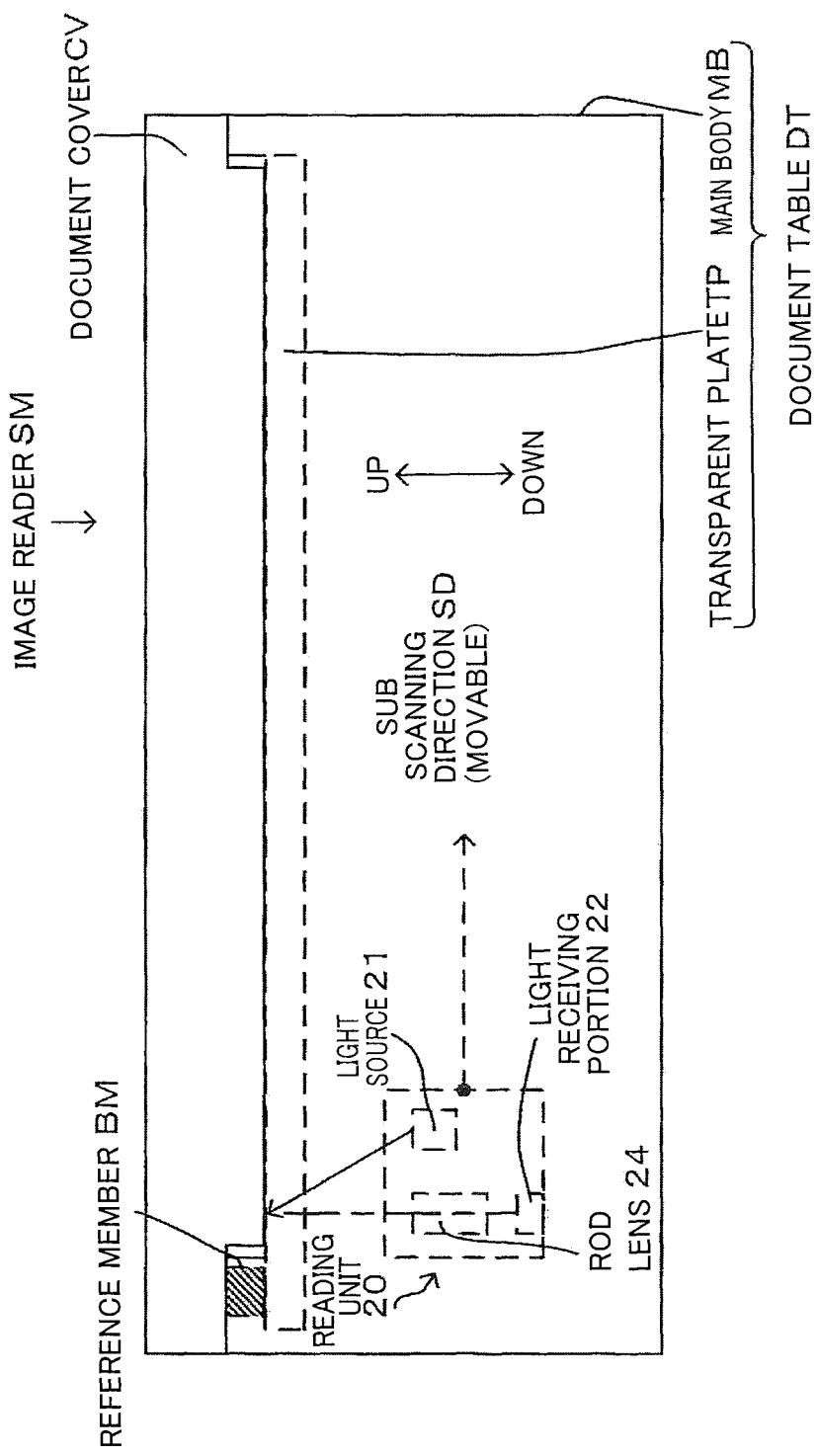
FIG. 1 is a view illustrating an internal structure of an image reader according to one embodiment.
Figure 2:
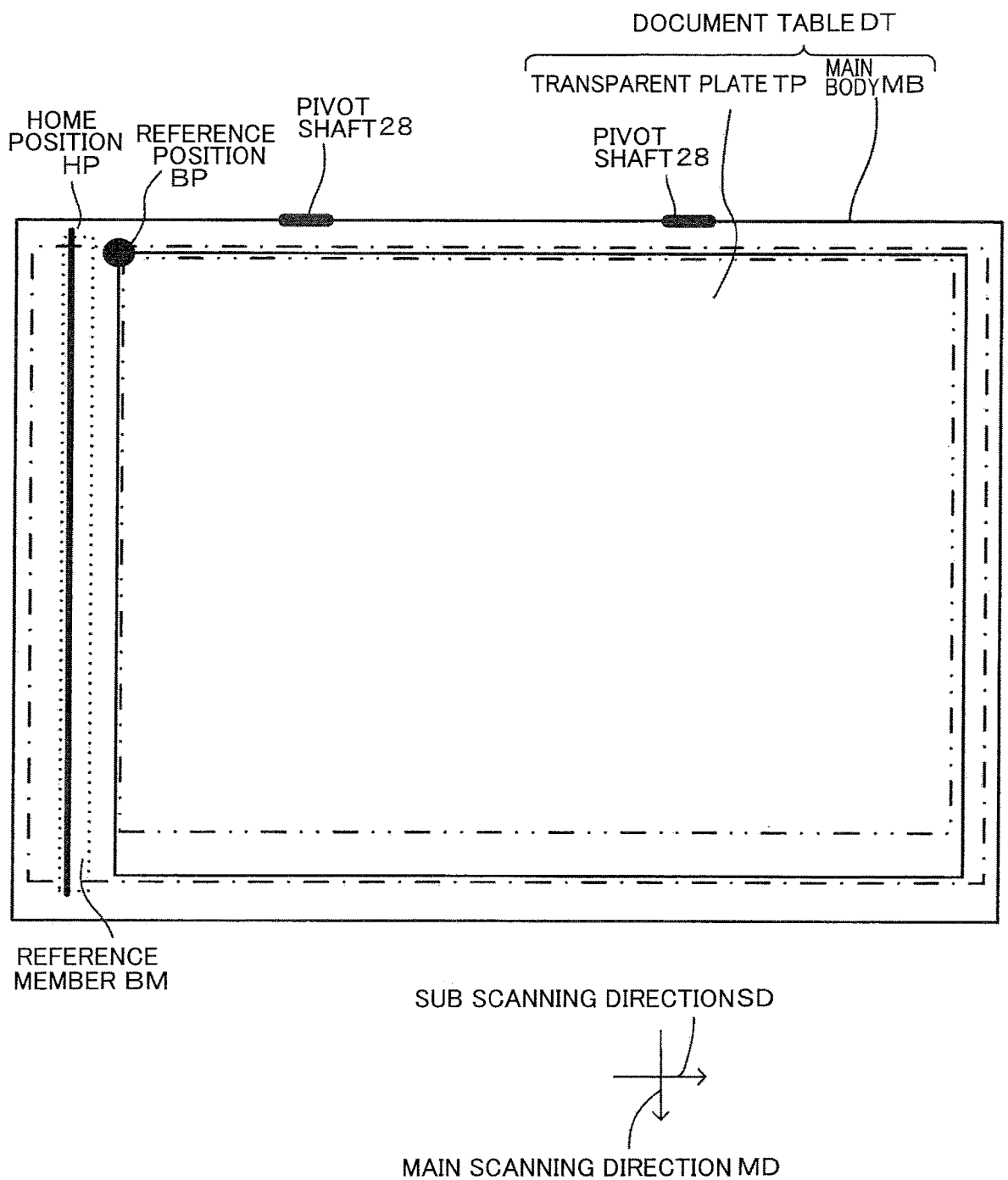
FIG. 2 is a top view of a document table.

An image reader SM according to one embodiment of the disclosure will now be explained with reference to the drawings. FIG. 1 is a front view of the image reader SM. FIG. 2 is a top view of a document table DT when viewed from above. In the following explanation, a rightward direction in FIG. 1 is regarded as a downstream side in a sub scanning direction SD, a downward direction in FIG. 2 is regarded as a downstream side in a main scanning direction MD, and a rightward direction in FIG. 2 is regarded as the downstream side in the sub scanning direction SD.

The image reader SM includes a document table DT and a document cover CV. The document table DT includes a main body MB and a transparent plate TP. The main body MB is a housing in which various components such as the transparent plate TP and a reading unit 20 are housed. As indicated by the long dashed short dashed line in FIG. 2, the transparent plate TP is housed in and fixed to the main body MB. The transparent plate TP is configured to support a book document BGS to be read. The document cover CV includes pivot shafts 28 disposed on the back of the main body MB (i.e., on a back side of the sheet of FIG. 1 in a direction perpendicular to the sheet surface of FIG. 1 and on an upper side in FIG. 2). The document cover CV is opened and closed on the front of the main body MB (i.e., on a front side of the sheet of FIG. 1 in the direction perpendicular to the sheet surface of FIG. 1 and on a lower side in FIG. 2).

The image reader SM further includes the reading unit 20 housed in the main body MB under the transparent plate TP. The reading unit 20 is movable with respect to the main body MB in the sub scanning direction SD, namely, in a right-left direction in FIG. 1. The reading unit 20 moves for reading the book document BGS supported by the transparent plate TP. The reading unit 20 is constituted by a contact image sensor (CIS). Specifically, the reading unit 20 includes a light source 21, a rod lens 24, and a light receiving portion 22. The light source 21 is constituted by red, blue, and green light emitting diodes and emits light toward the transparent plate TP. The rod lens 24 forms an image on the light receiving portion 22 using reflected light.

The light receiving portion 22 includes a multiplicity of photoelectric conversion elements 23 arranged in the main scanning direction and incorporates an analog shift register and an amplifier (both not shown). An output of each photoelectric conversion element 23 represents an amount of the light received in a corresponding one of pixels arranged in the main scanning direction. A top pixel, which corresponds to one of the photoelectric conversion elements 23 located at the top in the main scanning direction MD, is the most upstream pixel in the main scanning direction MD shown in FIG. 2, and an end pixel, which corresponds to one of the photoelectric conversion elements 23 located at the end in the main scanning direction MD, is the most downstream pixel in the main scanning direction MD shown in FIG. 2. In the present embodiment, one line is a pixel group constituted by pixels from the top pixel to the end pixel in the main scanning direction MD.

In FIG. 2, an upper surface of the document table DT is constituted by an upper surface of the main body MB and an exposed surface of the transparent plate TP that is exposed toward the document cover CV. The main body MB is provided with the pivot shafts 28. As indicated by the long dashed short dashed line in FIG. 2, the transparent plate TP has a rectangular shape constituted by long sides extending in the sub scanning direction SD and short sides extending in the main scanning direction MD. The exposed surface of the transparent plate TP that is exposed toward the document cover CV is indicated by the solid line in FIG. 2. In the exposed surface of the transparent plate TP, the most upstream position in the main scanning direction MD and the most upstream position in the sub scanning direction SD define a reference position BP. The book document BGS is placed or set on the transparent plate TP with respect to the reference position BP. The document cover CV pivots about the pivot shafts 28 so as to be opened and closed. The pivot shafts 28 are disposed at respective two positions of the main body MB located upstream in the main scanning direction MD. A surface of the document cover CV configured to contact the transparent plate TP is slightly smaller than the exposed surface of the transparent plate TP that is exposed toward the document cover CV. When the document cover CV is closed in a state in which a single sheet document is placed on the transparent plate TP, the reading unit 20 located opposite to the document cover CV reads an edge of the document cover CV in the vicinity of the reference position BP in the main scanning direction MD. When the document cover CV is closed in a state in which the book document BGS is placed on the transparent plate TP, the document cover CV is apart from the transparent plate TP due to the thickness of the book document BGS, and the reading unit 20 located opposite to the book document BGS does not read the edge of the document cover CV in the vicinity of the reference position BP in the main scanning direction MD.

The image reader SM further includes a reference member BM fixed to an upper surface of the transparent plate TP. The reference member BM is disposed at an upstream end portion of the transparent plate TP in the sub scanning direction SD, namely, at a left end portion of the transparent plate in FIG. 2. The reference member BM is a white member extending along the main scanning direction MD. A home position HP of the reading unit 20 is located right below the reference member BM. The reading unit 20 is movable in the sub scanning direction SD with respect to the home position HP.

Electrical Configuration of Image Reader SM

Figures 3A, 3B:
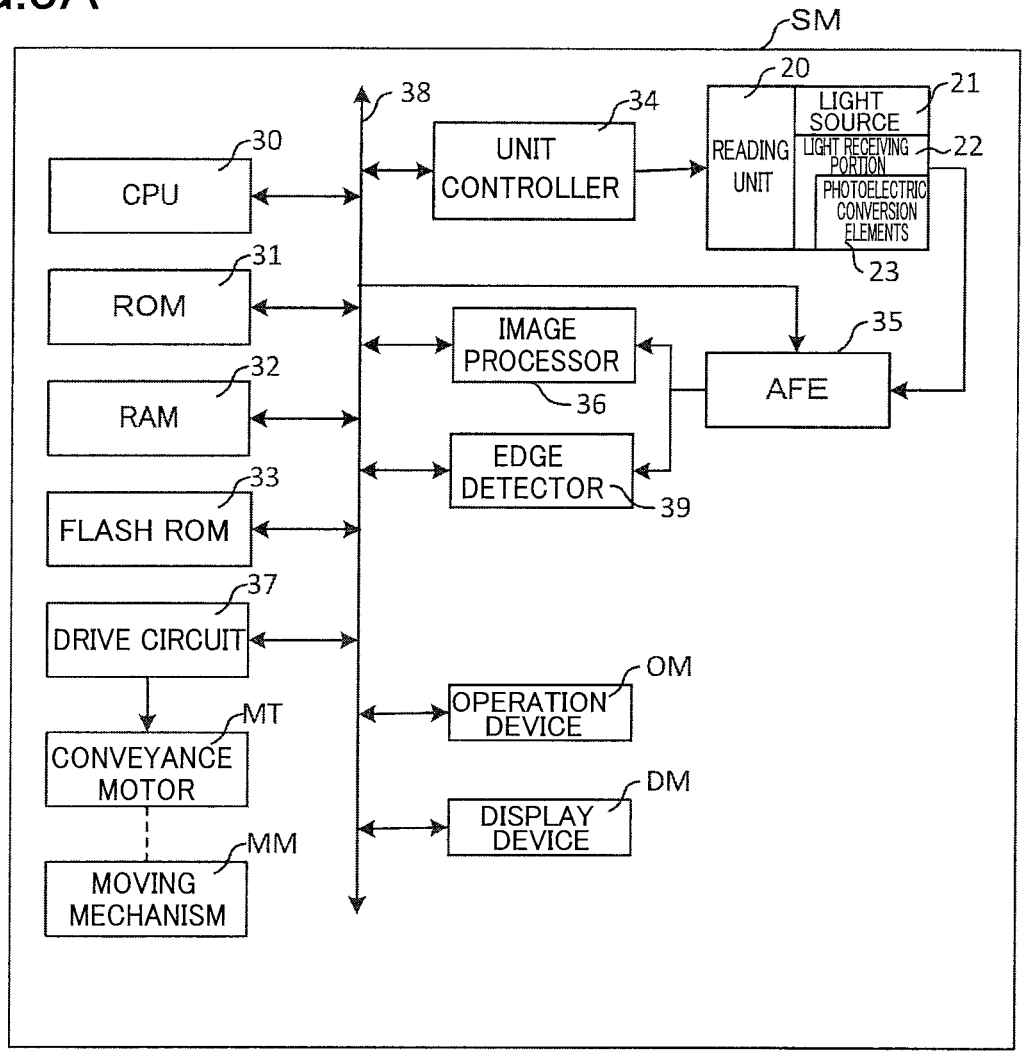
FIG. 3A is a block diagram illustrating an electrical configuration of the image reader and FIG. 3B is a table illustrating relationships between specific sizes and main scanning distances stored in a flash ROM.

Referring next to FIG. 3A, an electrical configuration of the image reader SM will be explained. As shown in FIG. 3A, the image reader SM includes, as main constituent elements, a CPU 30, a ROM 31, a RAM 32, a flash ROM 33, a unit controller 34, an analog front end (hereinafter referred to as "AFE") 35, an image processor 36, an edge detector 39, and a drive circuit 37. These constituent elements are connected to an operation device OM and a display device DM via a bus 38. The operation device OM is constituted by a plurality of keys including a start button, a determination (enter) button, and so on. A user operates the operation device OM to input various instructions to the image reader SM. The display device DM is a display on which various sorts of information are displayed.

The ROM 31 stores programs for executing various processes of the image reader SM such as a reading main process and processes in sub routines of the main process. The CPU 30 controls devices according to the program read out from the ROM 31. The flash ROM 33 is a nonvolatile memory into and from which data can be written and read. The flash ROM 33 stores data formed by control processes executed by the CPU 30 such as data obtained by the reading main process. The RAM 32 temporarily stores calculation results formed by the control processes executed by the CPU 30.

The unit controller 34 is connected to the reading unit 20. Based on a command from the CPU 30, the unit controller 34 sends, to the light source 21, a signal for controlling illumination and extinction of the light source 21 and a signal for controlling a value of a current that flows in the light source 21. Further, based on a command from the CPU 30, the unit controller 34 sends, to the light receiving portion 22, a serial in signal SI for transferring electric signals of the multiplicity of the photoelectric conversion elements 23 concurrently to the shift register and a clock signal CLK for sequentially outputting electric signals of the shift register. In response to reception of these signals from the unit controller 34, the reading unit 20 causes the light source 21 to illuminate and sends, to the AFE 35, analog signals in accordance with light amounts received by the light receiving portion 22.

The AFE 35 is connected to the reading unit 20 and converts the analog signals sent from the reading unit 20 into digital data, based on a command from the CPU 30. The AFE 35 has a predetermined input range and a resolving power. In the case where the resolving power is 10 bit, namely, in the case where tone data is represented by 10-bit data, the tone data is tones from "0" to "1023". In this case, the AFE 35 converts the analog signals sent from the reading unit 20 into tone data of 10 bit (0-1023) as the digital data. The digital data converted by the AFE 35 is sent to the image processor 36 and the edge detector 39.

The image processor 36 is constituted by an ASIC which is an IC dedicated to image processing and is configured to perform image processing on the digital data. The image processing is correction processing such as gamma correction. The image processor 36 performs the image processing on the digital data to form digital image data. The formed digital image data is stored in the RAM 32 via the bus 38.

The edge detector 39 is configured to perform a known edge detection process such as a process of applying a Sobel filter to the digital data to form monochrome data WBD. The edge detector 39 forms "1" as the monochrome data WBD for an edge pixel and "0" as the monochrome data WBD for a non-edge pixel. The formed monochrome data WBD is stored in the RAM 32.

The drive circuit 37 is connected to a conveyance motor MT and is configured to drive the conveyance motor MT based on a drive command sent from the CPU 30. The drive circuit 37 rotates the conveyance motor MT according to a rotation amount and a rotation direction commanded by the drive command. When the conveyance motor MT rotates by a predetermined amount, the moving mechanism MM operates by a predetermined amount so as to move the reading unit 20 by a predetermined distance in the sub scanning direction SD.

Referring next to FIG. 3B, there will be explained relationships between specific sizes SPS and main scanning distances MDL stored in the flash ROM 33 in the present embodiment. The flash ROM 33 stores "A4", "A5", and "A6" each as a specific size SPS which is a size of a document having a predetermined size. Each specific size SPS is stored in association with the corresponding main scanning distance MDL. That is, "3508" is stored as the main scanning distance MDL in association with "A4" of the specific size SPS, "2480" is stored as the main scanning distance MDL in association with "A5" of the specific size SPS, and "1748" is stored as the main scanning distance MDL in association with "A6" of the specific size SPS. The value "3508" associated with "A4" represents the number of pixels in the main scanning direction MD in the case where a reading resolution in the main scanning direction MD is 300 DPI, and the value "3508" is equal to "297 mm" when converted into a length in the main scanning direction MD. The value "2480" associated with "AS" represents the number of pixels in the main scanning direction MD in the case where the reading resolution in the main scanning direction MD is 300 DPI, and the value "2480" is equal to "210 mm" when converted into the length in the main scanning direction MD. The value "1748" associated with "A6" represents the number of pixels in the main scanning direction MD in the case where the reading resolution in the main scanning direction MD is 300 DPI, and the value "1748" is equal to "148 mm" when converted into the length in the main scanning direction MD.

Operations of Image Reader SM

<Reading Main Process>

There will be next explained operations of the image reader SM with reference to the drawings. The image reader SM mainly executes a reading main process of reading the book document BGS. Processes R1-R7 in the reading main process shown in FIG. 4 are executed by the CPU 30.

Figure 4:
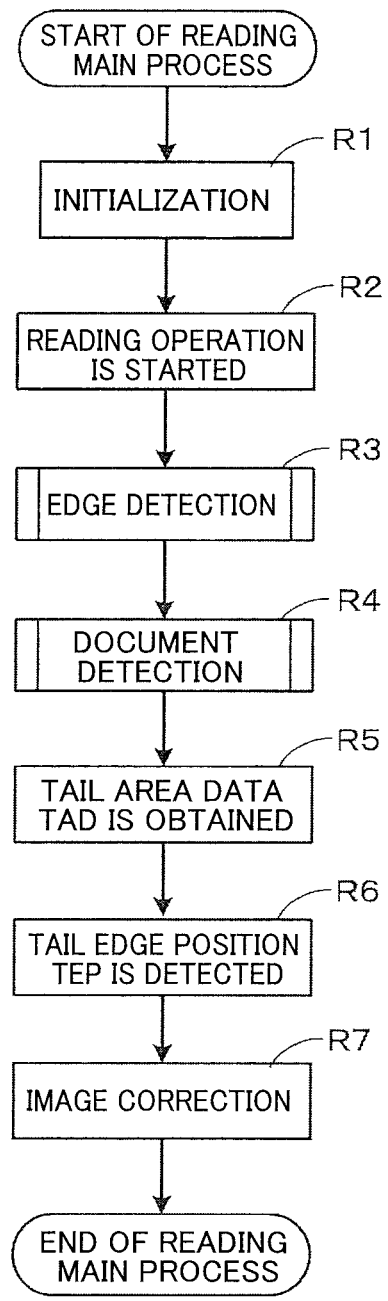
FIG. 4 is a flowchart illustrating a reading main process.
Figure 13A:
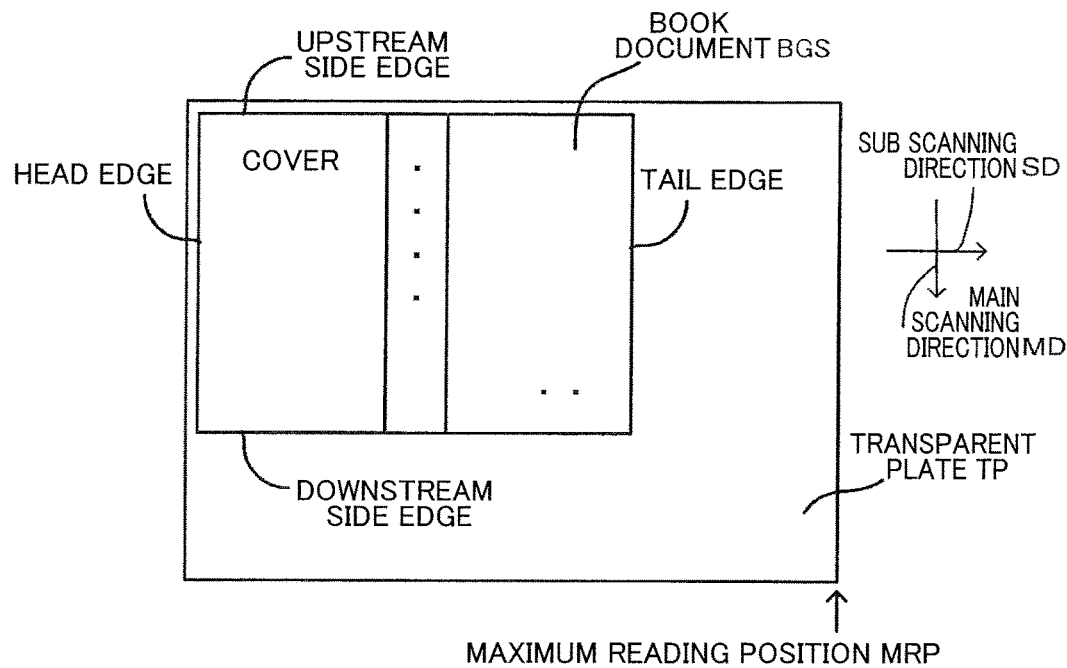
FIG. 13A is a view for explaining various portions of a book document when placed on a transparent plate and FIG. 13B is a view for explaining monochrome data obtained by reading the book document placed on the transparent plate and various sorts of information such as a remaining distance in a sub scanning direction.
Figure 13B:
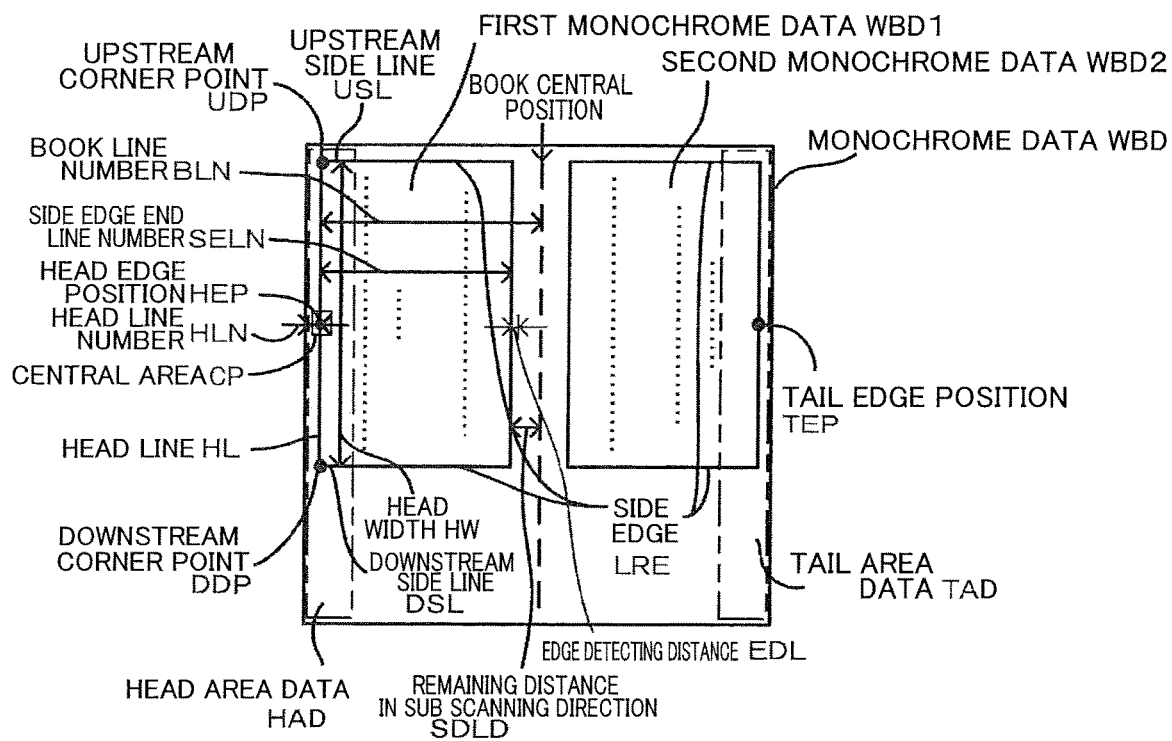

The reading main process shown in FIG. 4 is started when a user sets the book document BGS on the transparent plate TP and presses down a reading start button of the operation device OM. That is, the CPU 30 starts the reading main process in response to reception of a command that the user has pressed down the reading start button. FIG. 13A is a view for explaining positions of various portions of the book document BGS in a state in which the book document BGS is set on the transparent plate TP. A region indicated by the solid line in FIG. 13A including a maximum reading position MRP corresponds to a region indicated by the long dashed double-short dashed line in FIG. 2. FIG. 13B is a view for explaining the monochrome data WBD obtained by reading the book document BGS placed on the transparent plate TP and various sorts of information such as a remaining distance SDLD in the sub scanning direction. In FIGS. 13A and 13B, the main scanning direction MD and the sub scanning direction SD are indicated by respective arrows.

When the reading unit 20 reads the book document BGS in the state in which the book document BGS is placed as shown in FIG. 13A, the image reader SM obtains the monochrome data WBD shown in FIG. 13B. As shown in FIG. 13A, the book document BGS is placed such that a head edge, a tail edge, an upstream side edge, and a downstream side edge of the book document BGS are located at respective positions shown in FIG. 13A. The monochrome data WBD shown in FIG. 13B includes first monochrome data WBD1 and second monochrome data WBD2 corresponding to respective two pages of the book document BGS when the book document BGS placed in a two-page spread state is read. Here, the book document BGS placed in the two-page spread state is explained by way of example. The book document BGS, however, may be placed otherwise. For instance, the book document BGS may be placed in a closed state for reading only a cover thereof or may be placed such that the book document BSG of FIG.

13A is rotated by 90 degrees. In place of the book document BGS, a single sheet document may be placed.

The CPU 30 initializes the unit controller 34, the image processor 36, etc. (R1). Specifically, the CPU 30 obtains from the flash ROM 33 set values of the clock signal CLK and the serial in signal SI corresponding to the reading resolution of 300 DPI in the main scanning direction MD and the reading resolution of 300 DPI in the sub scanning direction SD, and sets the set values in the unit controller 34. Further, the CPU 30 obtains from the flash ROM 33 a set value for reading the book document BSG at the reading resolution of 300 DPI in the main scanning direction MD and at the reading resolution of 300 DPI in the sub scanning direction SD, and sets the set value in the image processor 36. The CPU 30 sets a total line number TLN to "0" and stores it in the RAM 32. The CPU 30 sets a document flag OFG to off and stores it in the RAM 32.

The CPU 30 starts the reading operation (R2). Specifically, the CPU 30 sends a drive command to the drive circuit 37 to cause the reading unit 20 to be moved to the reference position BP. The CPU 30 sends a command to the drive circuit 37 and the unit controller 34 to start the reading operation for reading the book document BGS while moving the reading unit 20 downstream in the sub scanning direction SD from the reference position BP.

The CPU 30 executes a head edge detection process (R3). The head edge detection process will be later explained in detail and is briefly explained here. The CPU 30 calculates a head edge position HEP, a head width HW, an inclination CA of a head line HL, and a book line number BLN shown in FIG. 13B, and stores them in the RAM 32. The CPU 30 sets a horizontal book flag HBFG to on or off, and stores it in the RAM 32.

The CPU 30 executes a document detection process (R4). The document detection process will be later explained in detail and is briefly explained here. The CPU 30 continues the reading operation until the document flag OFG becomes off. The CPU 30 sets the continuation flag CFG to on or off. When the continuation flag CFG is off, the CPU 30 moves the reading unit 20 to the home position HP. When the continuation flag CFG is on, the CPU 30 continues the reading operation until the document flag OFG becomes off.

The CPU 30 obtains tail area data TAD indicated by the long dashed double-short dashed line in FIG. 13B (R5). Specifically, the CPU 30 obtains, as the tail area data TAD, the monochrome data WBD in the RAM 32 ranging from an end line which is the most downstream line in the sub scanning direction SD to the 350th line counted from the end line toward the upstream side in the sub scanning direction SD. That is, the tail area data TAD is the monochrome data WBD in a range from the end line to the 350th line toward the upstream side in the sub scanning direction SD.

The CPU 30 detects a tail edge position TEP shown in FIG. 13B (R6). Specifically, the CPU 30 detects, toward the upstream side in the sub scanning direction SD starting from the end line, any pixel at which the monochrome data WBD represents "1" for the respective pixels arranged in the main scanning direction MD in a tail area TA. Among the detected pixels at which the monochrome data WBD represents "1", the CPU 30 detects, as the tail edge position TEP, the position of the pixel located most downstream in the sub scanning direction SD.

The CPU 30 executes an image correction processing with respect to the digital image data stored in the RAM 32 (R7). Specifically, the CPU 30 rotates the digital image data by a rotation angle corresponding to the inclination CA. The CPU 30 crops out the digital image data ranging from the head edge position HEP to the tail edge position TEP in the sub scanning direction SD and crops out the digital image data so as to have the head width HW in the main scanning direction MD. The CPU 30 stores the cropped digital image data in the RAM 32. The reading main process ends when the process R7 ends.

<Head Edge Detection Process R3>

Figure 5:
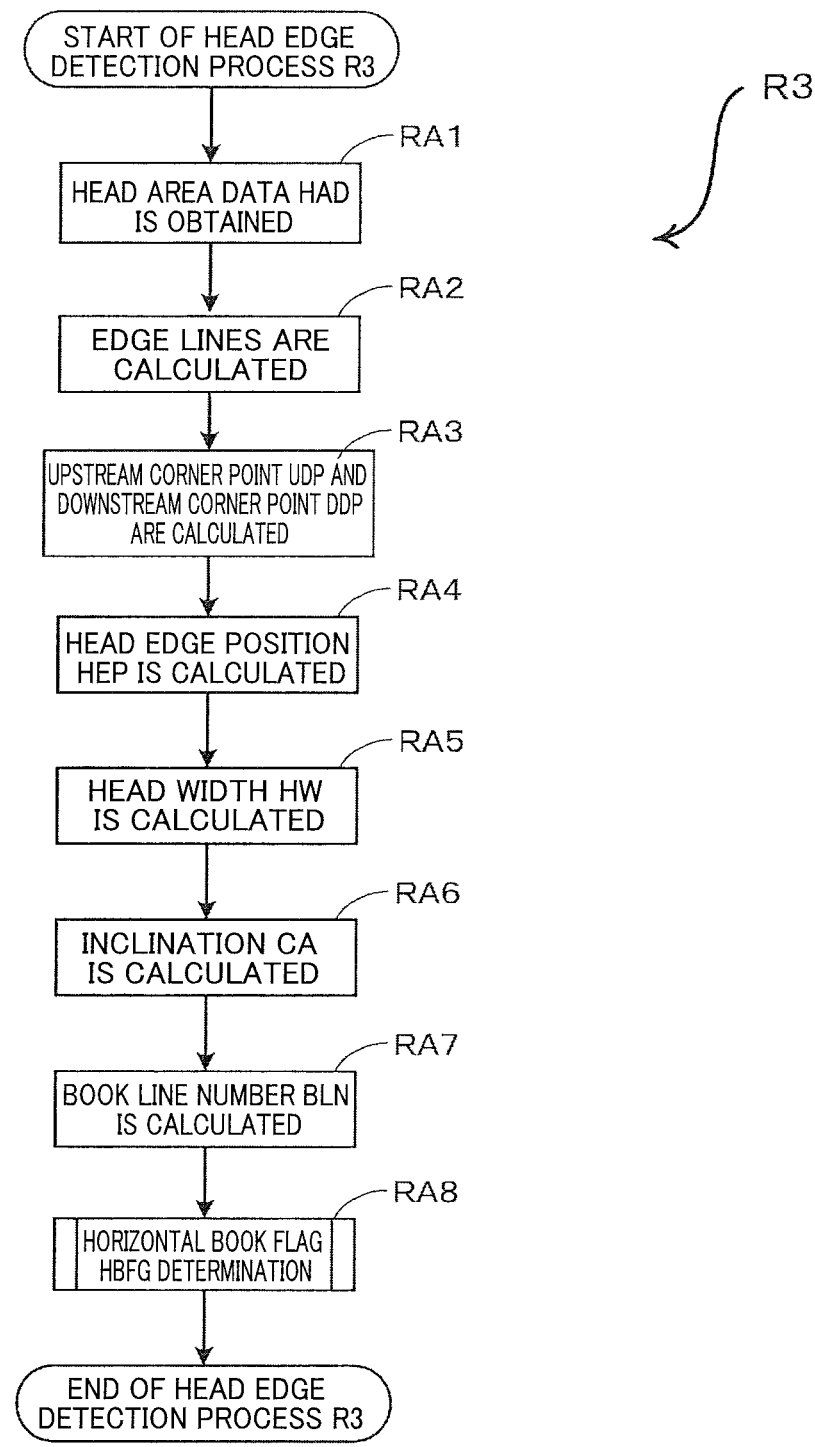
FIG. 5 is a flowchart illustrating a head edge detection process R3.

When the head edge detection process R3 of FIG. 5 starts, the CPU 30 obtains head area data HAD shown in FIG. 13B (RA1). Specifically, the CPU 30 obtains, as the head area data HAD, the monochrome data WBD in the RAM 32 ranging from a top line which is the most upstream line in the sub scanning direction SD to the 350th line counted from the top line toward the downstream side in the sub scanning direction. That is, the head area data HAD is the monochrome data WBD in a range from the top line to the 350th line toward the downstream side in the sub scanning direction SD.

The CPU 30 calculates edge lines (RA2). Specifically, the CPU 30 calculates, from the head area data HAD, the head line HL corresponding to the head edge of the book document BGS, an upstream side line USL corresponding to the upstream side edge of the book document BGS, and a downstream side line DSL corresponding to the downstream side edge of the book document BGS, as shown in FIGS. 13A and 13B.

The CPU 30 calculates an upstream corner point UDP and a downstream corner point DDP shown in FIG. 13B (RA3). Specifically, the CPU 30 calculates an intersection of the head line HL and the upstream side line USL as the upstream corner point UDP. The CPU 30 calculates an intersection of the head line HL and the downstream side line DSL as the downstream corner point DDP.

The CPU 30 calculates the head edge position HEP shown in FIG. 13B (RA4). Specifically, the CPU 30 calculates, as the head edge position HEP, a midpoint between the upstream corner point UDP and the downstream corner point DDP. The CPU 30 adds a head line number HLN to the total line number TLN. The head line number HLN is the number of lines existing between: a line passing the reference position BP and parallel to the main scanning direction MD; and the head edge position HEP.

The CPU 30 calculates the head width HW shown in FIG. 13B (RA5). Specifically, the CPU 30 calculates, as the head width HW, the number of pixels between the upstream corner point UDP and the downstream corner point DDP.

The CPU 30 calculates the inclination CA of the head line HL shown in FIG. 13B (RA6). Specifically, based on inclination of the head line HL, the CPU 30 calculates, as the inclination CA, a direction and an angle of the inclination of the head line HL.

The CPU 30 calculates the book line number BLN shown in FIG. 13B (RA7). Specifically, the CPU 30 multiplies the head width HW by a predetermined ratio PDR to calculate the book line number BLN. The predetermined ratio PDR is a value obtained by dividing a length in the short-side direction of the specific size SPS by a length in the long-side direction of the specific size SPS. In the present embodiment, the predetermined ratio PDR is the inverse of a square root of "2" which is a value obtained by dividing the length in the short-side direction of the A4 size by the length in the long-side direction of the A4 size.

The CPU 30 executes a horizontal book flag HBFG determination process (RA8). The horizontal book flag HBFG determination process will be later explained in detail and is briefly explained here. The CPU 30 sets the horizontal book flag HBFG to off or on. The head edge detection process R3 ends when the process RA8 ends.

<Horizontal Book Flag HBFG Determination Process RA8>

Figure 6:
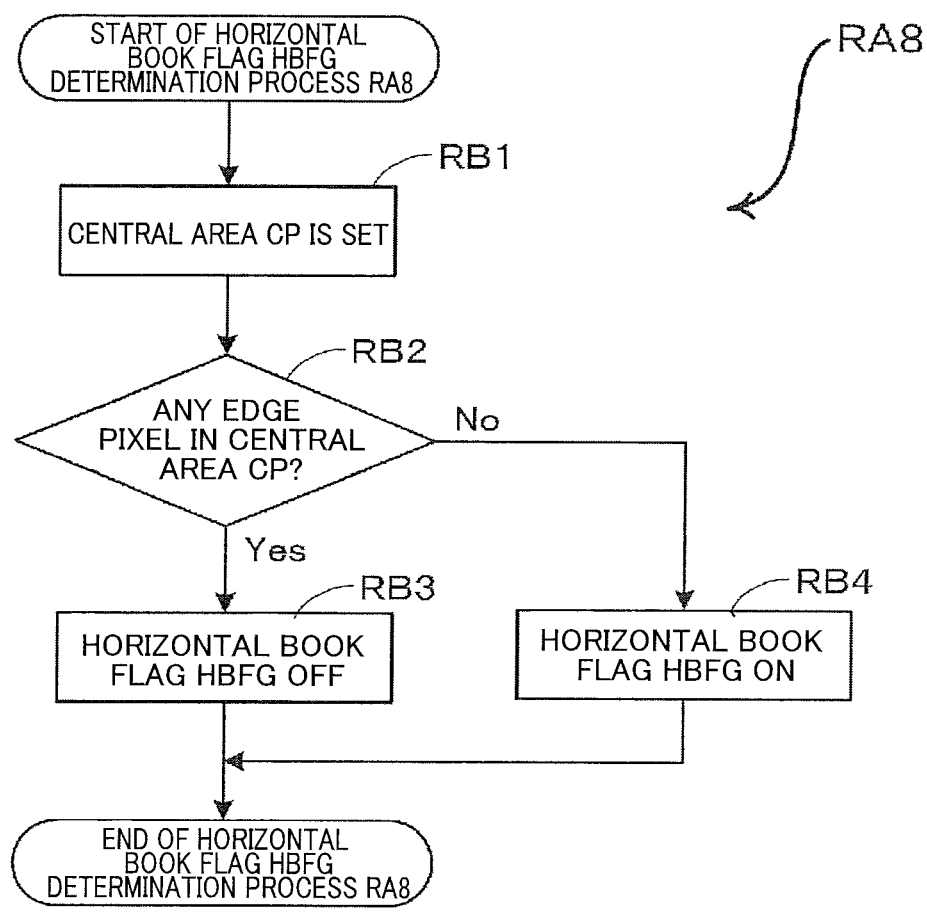
FIG. 6 is a flowchart illustrating a horizontal book flag HBFG determination process.

The horizontal book flag HBFG indicates whether a landscape format book is placed open on the document table DT such that its central bound portion extends in the sub scanning direction SD. When the horizontal book flag HBFG determination process RA8 of FIG. 6 starts, the CPU 30 sets a central area CP shown in FIG. 13B (RB1). Specifically, the CPU 30 sets, as the central area CP, an area spreading over eleven pixels in both the main scanning direction MD and the sub scanning direction SD with the head edge position HEP centered.

The CPU 30 determines whether there exist any edge pixel in the central area CP (RB2). When the monochrome data WBD for all pixels in the central area CP represents "0" (RB2: No), the CPU 30 determines that no edge pixels are present in the central area CP, and the control flow goes to a process RB4. When the monochrome data WBD for any of the pixels in the central area CP represents "1" (RB2: Yes), the CPU 30 determines that the edge pixel or pixels exist in the central area CP, and the control flow goes to a process RB3.

The CPU 30 sets the horizontal book flag HBFG to off and stores it in the RAM 32 (RB3). The horizontal book flag HBFG determination process RA8 ends when the process RB3 ends.

The CPU 30 sets the horizontal book flag HBFG to on and stores it in the RAM 32 (RB4). The horizontal book flag HBFG being on indicates that a landscape format book is placed open on the document table DT with its central bound portion extending in the sub scanning direction SD. The horizontal book flag HBFG determination process RA8 ends when the process RB4 ends.

<Document Detection Process R4>

Figure 7:
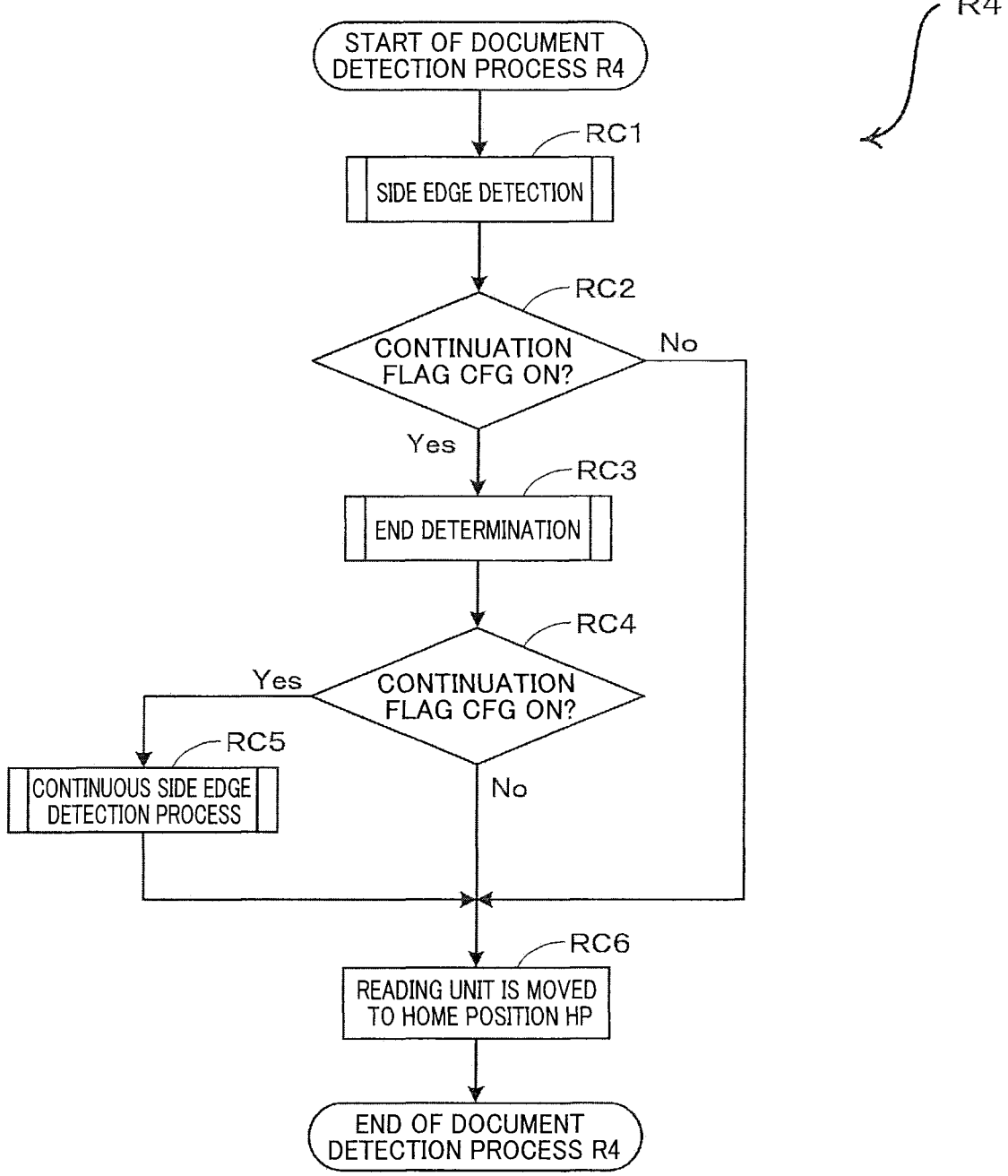
FIG. 7 is a flowchart illustrating a document detection process R4.

When the document detection process R4 of FIG. 7 starts, the CPU 30 executes a side edge detection process (RC1). The side edge detection process will be later explained in detail and is briefly explained here. The CPU 30 determines whether to detect any side edges LRE from the head edge position HEP toward the downstream side in the sub scanning direction SD until no side edges LRE are detected any more or until the total line number TLN becomes equal to the number of lines counted from the top line up to the maximum reading position MRP. When the total line number TLN becomes equal to the number of lines counted from the top line up to the maximum reading position MRP, the CPU 30 sets the continuation flag CFG to off and stops the reading operation. When no side edges LRE are detected any more, the CPU 30 calculates a side edge end line number SELN based on the total line number TLN and stops the reading operation.

The CPU 30 determines whether the continuation flag CFG is on (RC2). When the continuation flag CFG is on (RC2: Yes), the control flow goes to a process RC3. When the continuation flag CFG is off (RC2: No), the control flow goes to a process RC6.

The CPU 30 executes an end determination process (RC3). The end determination process will be later explained in detail and is briefly explained here. The CPU 30 sets the continuation flag CFG to off or calculates a maximum continuation line number MCLN based on the head width HW.

The CPU 30 determines whether the continuation flag CFG is on (RC4). When the continuation flag CFG is on (RC4: Yes), the control flow goes to a process RC5. When the continuation flag CFG is off (RC4: No), the control flow goes to the process RC6.

The CPU 30 executes a continuous side edge detection process (RC5). The continuous side edge detection process will be later explained in detail and is briefly explained here. The CPU 30 determines whether to detect any side edges LRE from the position at which the reading unit 20 has stopped at the process RC1 toward the downstream side in the sub scanning direction SD until the CPU 30 detects at least one side edge LRE, until the total line number TLN becomes equal to the maximum continuation line number MCLN, or until the total line number TLN becomes equal to the number of lines counted from the top line up to the maximum reading position MRP. When the CPU 30 detects the at least one side edge LRE, the CPU 30 executes a side edge detection process RH10 similar to the process RC1. When the process RC5 ends, the control flow goes to the process RC6.

When a negative determination (No) is made at the process RC2, when a negative determination (No) is made at the process RC4, or when the process RC5 ends, the CPU 30 moves the reading unit 20 to the home position HP (RC6). Specifically, the CPU 30 sends the drive command to the drive circuit 37 to move the reading unit 20 to the home position HP. The document detection process R4 ends when the process RC6 ends.

<Side Edge Detection Process RC1, RH10>

Figure 8:
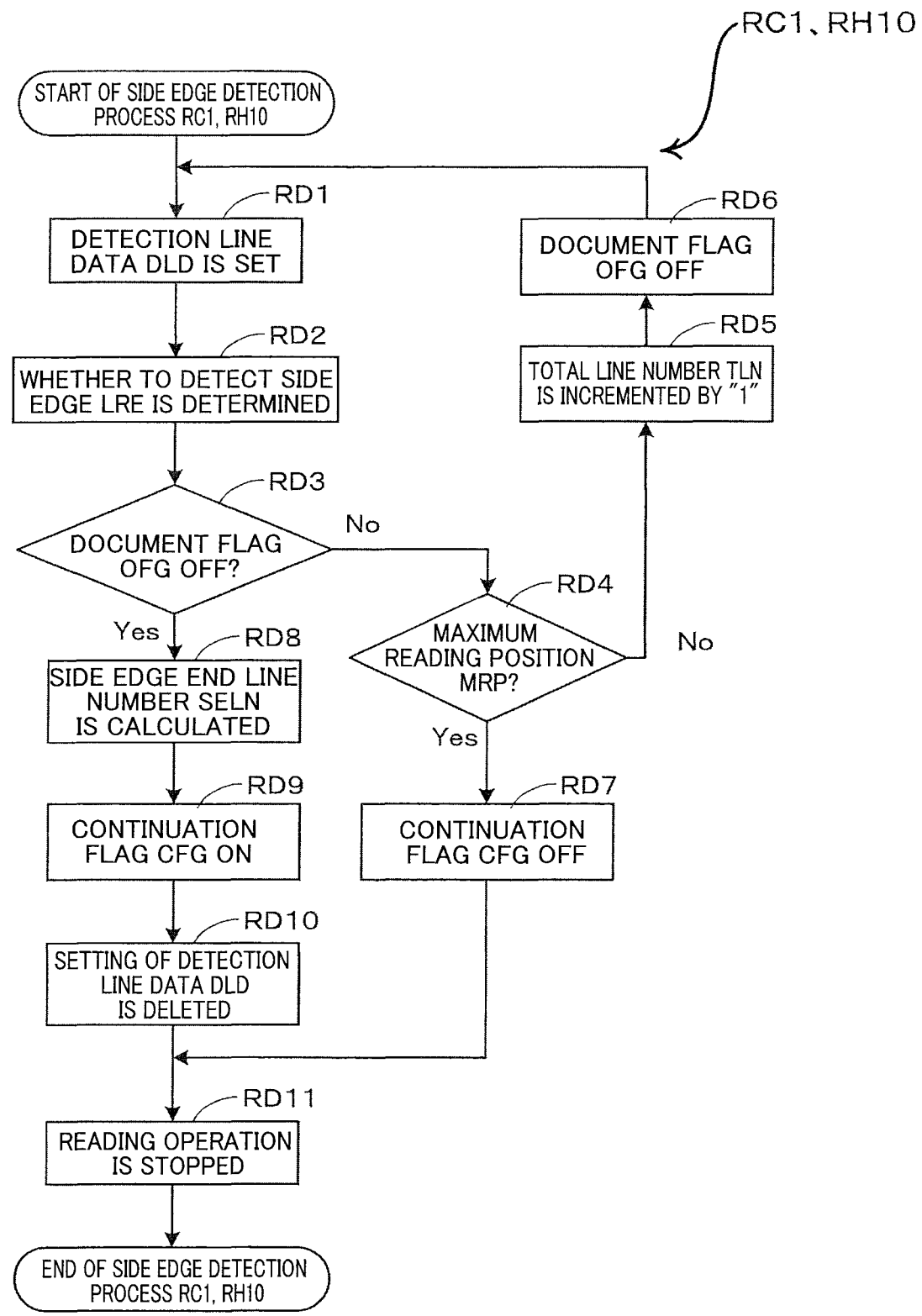
FIG. 8 is a flowchart illustrating a side edge detection process RC1, RH10.

When the side edge detection process RC1, RH10 of FIG. 8 starts, the CPU 30 sets detection line data DLD (RD1). Specifically, the CPU 30 sets, as the detection line data DLD, the monochrome data WBD of one line located apart from the top line by the total line number TLN. The CPU 30 stores the detection line data DLD in the RAM 32.

The CPU 30 determines whether to detect any side edges LRE in the detection line data DLD (RD2). Specifically, the CPU 30 determines that a side edge LRE is detected when "1" is contained in the detection line data DLD. In this case, the CPU 30 sets the document flag OFG to on and stores it in the RAM 32.

The CPU 30 determines whether the document flag OFG is on (RD3). When the document flag OFG is on (RD3: No) the control flow goes to a process RD4. When the document flag OFG is off (RD3: Yes), the control flow goes to a process RD8.

The CPU 30 determines whether the total line number TLN is equal to the number of lines counted from the top line up to the maximum reading position MRP (RD4). When the total line number TLN is equal to the number of lines counted from the top line up to the maximum reading position MRP (RD4: Yes), the control flow goes to a process RD7. When the total line number TLN is not equal to the number of lines counted from the top line up to the maximum reading position MRP (RD4: No), the control flow goes to a process RD5.

The CPU 30 increments the total line number TLN by "1" (RD5).

The CPU 30 sets the document flag OFG to off and stores it in the RAM 32 (RD6). When the process RD6 ends, the control flow goes to the process RD1.

When an affirmative determination (Yes) is made at the process RD4, the CPU 30 sets the continuation flag CFG to off and stores it in the RAM 32 (RD7). When the process RD7 ends, the control flow goes to a process RD11.

When an affirmative determination (Yes) is made at the process RD3, the CPU 30 calculates the side edge end line number SELN shown in FIG. 13B (RD8). Specifically, the CPU 30 calculates the side edge end line number SELN by subtracting the head line number HLN from the total line number TLN.

The CPU 30 sets the continuation flag CFG to on and stores it in the RAM 32 (RD9).

The CPU 30 deletes the setting of the detection line data DLD from the RAM 32 (RD10).

The CPU 30 stops the reading operation (RD11). Specifically, the CPU 30 sends a command to the drive circuit 37 and the unit controller 34 to stop the reading operation for reading the book document BGS and to stop driving the reading unit 20. The side edge detection process RC1, RH10 ends when the process RD11 ends.

<End Determination Process RC3>

Figure 9:
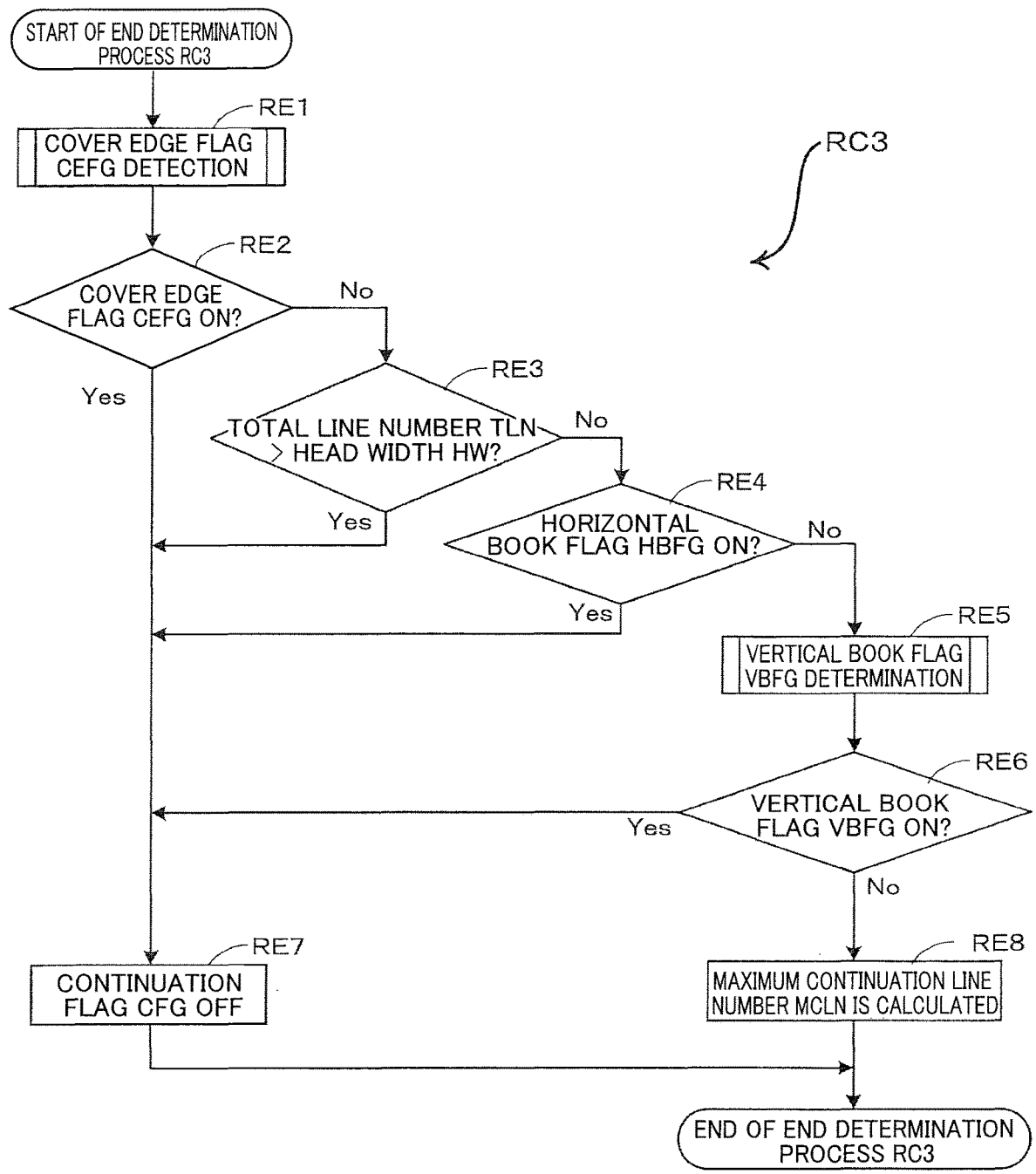
FIG. 9 is a flowchart illustrating an end determination process RC3.

When the end determination process RC3 of FIG. 9 starts, the CPU 30 executes a cover edge flag CEFG detection process (RE1). The cover edge flag CEFG detection process will be later explained in detail and is briefly explained here. The CPU 30 sets a cover edge flag CEFG to on or off and stores it in the RAM 32.

The CPU 30 determines whether the cover edge flag CEFG is on (RE2). When the cover edge flag CEFG is on (RE2: Yes), the control flow goes to a process RE7. When the cover edge flag CEFG is off (RE2: No), the control flow goes to a process RE3.

The CPU 30 determines whether the total line number TLN is larger than the head width HW (RE3). When the total line number TLN is larger than the head width HW (RE3: Yes), the control flow goes to the process RE7. When the total line number TLN is smaller than or equal to the head width HW (RE3: No), the control flow goes to a process RE4. Here, the head width HW corresponds to the number of pixels between the upstream corner point UDP and the downstream corner point DDP in the main scanning direction MD. In the present embodiment, the reading resolution in the main scanning direction MD and the reading resolution in the sub scanning direction SD are the same, namely, 300 DPI. Thus, if the head width HW is equal to the total line number TLN, a distance represented by the head width HW corresponding to the number of pixels in the main scanning direction MD is equal to a distance represented by the total line number TLN which is the number of lines in the sub scanning direction SD. Alternatively, instead of comparing, in the process RE3, between the head width HW and the total line number TLN, the CPU 30 may compare between the head width HW and the number of lines (which corresponds to the side edge end line number SELN) obtained by subtracting the head line number HLN from the total line number TLN. The CPU 30 may achieve a more accurate determination based on such comparison.

The CPU 30 determines whether the horizontal book flag HBFG is on (RE4). When the horizontal book flag HBFG is on (RE4: Yes), the control flow goes to the process RE7. When the horizontal book flag HBFG is off (RE4: No), the control flow goes to a process RE5.

The CPU 30 executes a vertical book flag VBFG determination process (RE5). The vertical book flag VBFG determination process will be later explained in detail and is briefly explained here. The CPU 30 sets a vertical book flag VBFG to on and stores it in the RAM 32.

The CPU 30 determines whether the vertical book flag VBFG is on (RE6). When the vertical book flag VBFG is on (RE6: Yes), the control flow goes to the process RE7. When the vertical book flag VBFG is off (RE6: No), the control flow goes to a process RE8.

When an affirmative determination (Yes) is made at the process RE2, when an affirmative determination (Yes) is made at the process RE3, when an affirmative determination (Yes) is made at the process RE4, or when an affirmative determination (Yes) is made at the process RE6, the CPU 30 sets the continuation flag CFG to off and stores it in the RAM 32 (RE7). The end determination process RC3 ends when the process RE7 ends.

When a negative determination is made at the process RE6, the CPU 30 calculates the maximum continuation line number MCLN (RE8). Specifically, the CPU 30 doubles a difference between the book line number BLN and the side edge end line number SELN and adds the side edge end line number SELN to the doubled value, so as to obtain the maximum continuation line number MCLN. The end determination process RC3 ends when the process RE8 ends. In the present embodiment, the doubled value of the difference between the book line number BLN and the side edge end line number SELN corresponds to a distance by which the document is to be read continuously at the continuous side edge detection process RC5.

<Cover Edge Flag CEFG Detection Process RE1>

Figure 10:
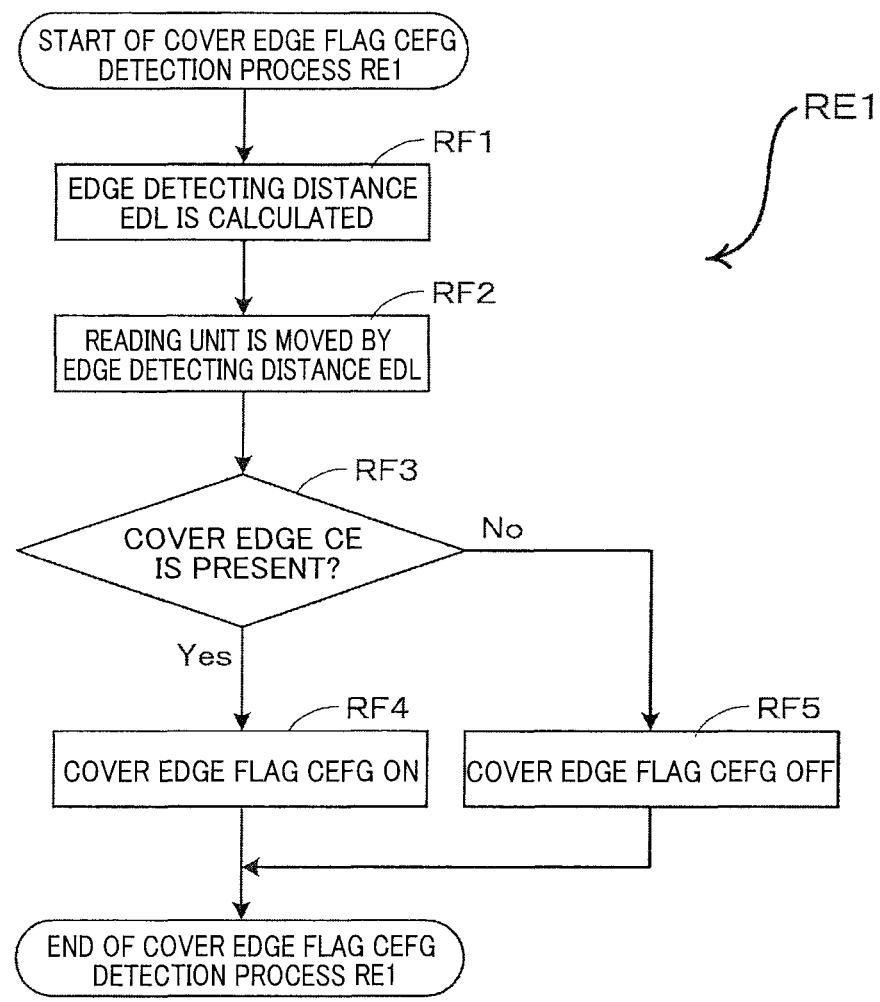
FIG. 10 is a flowchart illustrating a cover edge flag CEFG detection process RE1.

The cover edge flag CEFG indicates whether an edge of the document cover CV is detected in a state where a thick book is not placed on the document table DT. When the cover edge flag CEFG detection process RE1 of FIG. 10 starts, the CPU 30 calculates an edge detecting distance EDL (RF1). Specifically, the CPU 30 multiplies a tangent of the inclination angle of the inclination CA by the head width HW, so as to obtain the edge detecting distance EDL. The CPU 30 adds the edge detecting distance EDL to the total line number TLN.

The CPU 30 moves the reading unit 20 by the edge detecting distance EDL (RF2). Specifically, the CPU 30 sends a drive command to cause the reading unit 20, which is located at a position where the CPU 30 has stopped the reading unit 20 at the process RC1, to be moved downstream in the sub scanning direction SD by the edge detecting distance EDL.

The CPU 30 determines whether a cover edge CE is present (RF3). Specifically, the CPU 30 determines whether "1" is contained in the monochrome data WBD of one line obtained by performing the reading operation at a position to which the CPU 30 has moved the reading unit 20 at the process RF2. When "1" is contained in the monochrome data WBD of the one line (RF3: Yes), the CPU 30 determines that the cover edge CE is present, and the control flow goes to a process RF4. When "1" is not contained in the monochrome data WBD of the one line (RF3: No), the CPU 30 determines that the cover edge CE is not present, and the control flow goes to a process RF5.

The CPU 30 sets the cover edge flag CEFG to on and stores it in the RAM 32 (RF4). The cover edge flag CEFG being on indicates that an edge of the document cover CV is detected in a state where a thick book is not placed on the document table DT. The cover edge flag CEFG detection process RE1 ends when the process RF4 ends.

When a negative determination (No) is made at the process RF3, the CPU 30 sets the cover edge flag CEFG to off and stores it in the RAM 32 (RF5). The cover edge flag CEFG detection process RE1 ends when the process RF5 ends.

<Vertical Book Flag VBFG Determination Process RE5>

Figure 11:
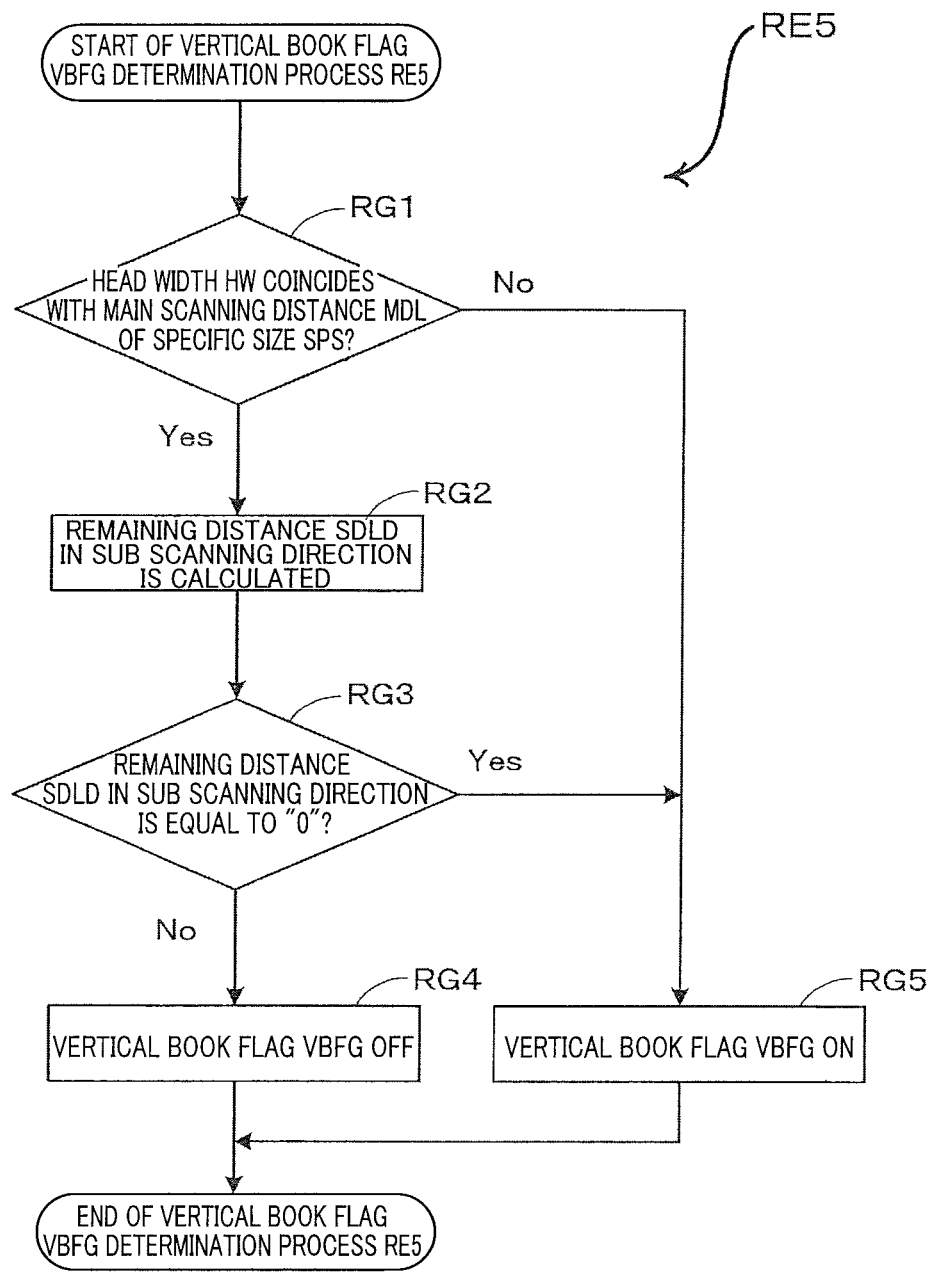
FIG. 11 is a flowchart illustrating a vertical book flag VBFG determination process RE5.

The vertical book flag VBFG indicates whether a portrait format book is placed open on the document table DT such that its central bound portion extends in the main scanning direction MD. When the vertical book flag VBFG determination process RE5 of FIG. 11 starts, the CPU 30 determines whether the head width HW coincides with the main scanning distance MDL of the specific size SPS (RG1). Specifically, the CPU 30 determines whether the head width HW coincides with any one of the main scanning distances MDL stored in the flash ROM 33 in association with the respective specific sizes SPS shown in FIG. 3B. When the head width HW coincides with any one of the main scanning distances MDL (RG1: Yes), the control flow goes to a process RG2. When the head width HW coincides with none of the main scanning distances MDL (RG1: No), the control flow goes to a process RG5.

The CPU 30 calculates the remaining distance SDLD in the sub scanning direction shown in FIG. 13B (RG2). Specifically, the CPU 30 calculates the remaining distance SDLD in the sub scanning direction by subtracting the side edge end line number SELN from the book line number BLN. The CPU 30 stores, in the RAM 32, the remaining distance SDLD in the sub scanning direction.

The CPU 30 determines whether the remaining distance SDLD in the sub scanning direction is equal to "0" (RG3). When the remaining distance SDLD in the sub scanning direction is equal to "0" (RG3: Yes), the control flow goes to the process RG5. When the remaining distance SDLD in the sub scanning direction is not equal to "0" (RG3: No), the control flow goes to a process RG4.

The CPU 30 sets the vertical book flag VBFG to off and stores it in the RAM 32 (RG4). The vertical book flag VBFG being on indicates that a portrait format book is placed open on the document table DT with its central bound portion extending in the main scanning direction MD. The vertical book flag VBFG determination process RE5 ends when the process RG4 ends.

When a negative determination (No) is made at the process RG1 or when an affirmative determination (Yes) is made at the process RG3, the CPU 30 sets the vertical book flag VBFG to on and stores it in the RAM 32 (RG5). The vertical book flag VBFG determination process RE5 ends when the process RG5 ends.

<Continuous Side Edge Detection Process RC5>

Figure 12:
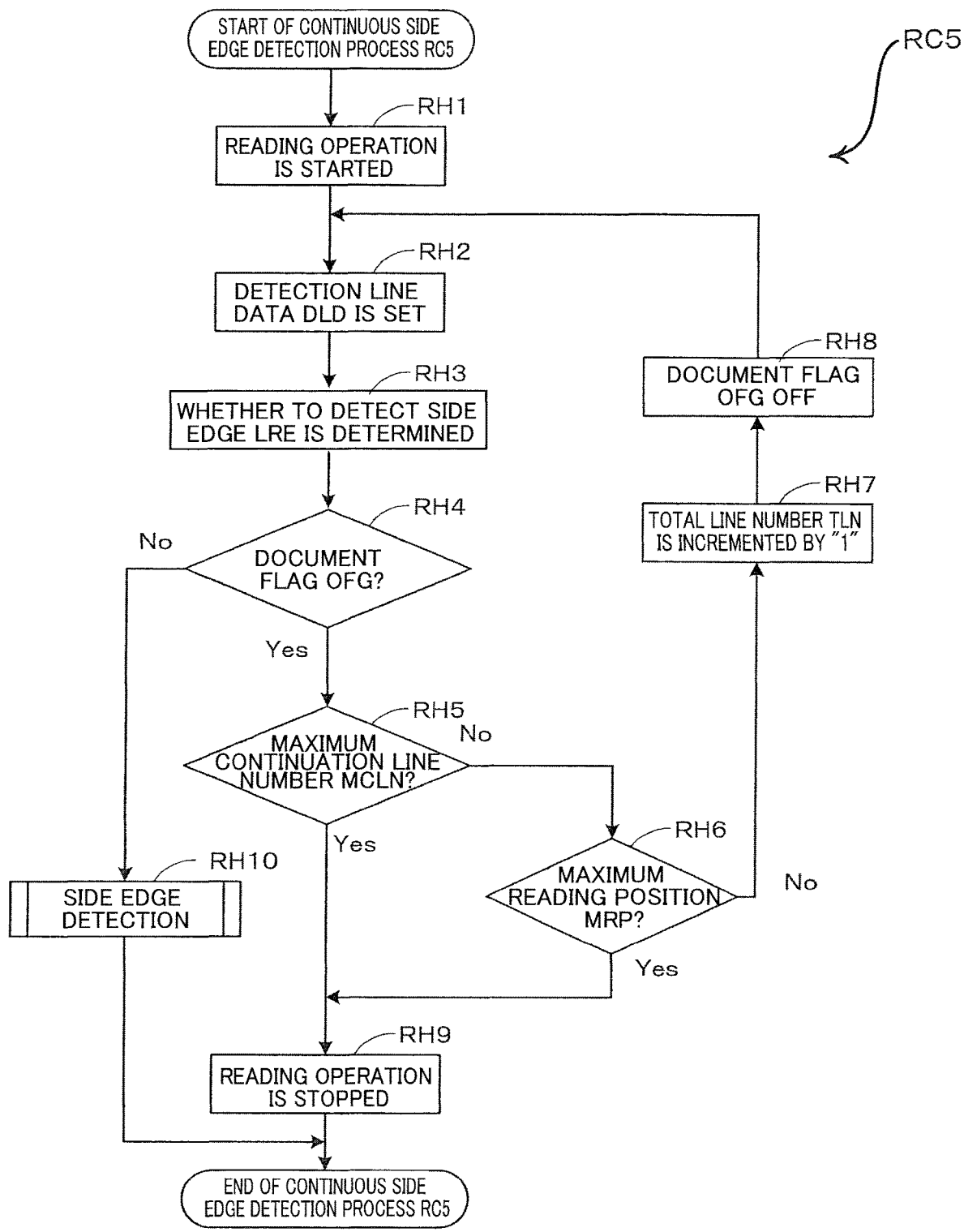
FIG. 12 is a flowchart illustrating a continuous side edge detection process RC5.

When the continuous side edge detection process RC5 of FIG. 12 starts, the CPU 30 starts the reading operation (RH1). Specifically, the CPU 30 sends a command to the drive circuit 37 and the unit controller 34 to start the reading operation for reading the book document BGS while moving the reading unit 20 downstream in the sub scanning direction SD from the position to which the CPU 30 has moved the reading unit 20 at the process RF2.

The CPU 30 sets the detection line data DLD (RH2). Specifically, the CPU 30 sets, as the detection line data DLD, the monochrome data WBD of one line located apart from the top line by the total line number TLN and stores it in the RAM 32. The total line number TLN when the process RH2 is executed for the first time at the process RC5 corresponds to the total line number TLN to which the edge detecting distance EDL has been added at the process RF1.

The CPU 30 determines whether to detect any side edges LRE in the detection line data DLD (RH3). Specifically, the CPU 30 determines that a side edge LRE is detected when "1" is contained in the detection line data DLD. In this case, the CPU 30 sets the document flag OFG to on.

The CPU 30 determines whether the document flag OFG is off (RH4). When the document flag OFG is on (RH4: No), the control flow goes to a process RH10. When the document flag OFG is off (RH4: Yes), the control flow goes to a process RH5.

The CPU 30 determines whether the total line number TLN is equal to the maximum continuation line number MCLN (RH5). When the total line number TLN is equal to the maximum continuation line number MCLN (RH5: Yes), the control flow goes to a process RH9. When the total line number TLN is not equal to the maximum continuation line number MCLN (RH5: No), the control flow goes to a process RH6.

The CPU 30 determines whether the total line number TLN is equal to the number of lines counted from the top line up to the maximum reading position MRP (RH6). When the total line number TLN is equal to the number of lines counted from the top line up to the maximum reading position MRP (RH6: Yes), the control flow goes to a process RH9. When the total line number TLN is not equal to the number of lines counted from the top line up to the maximum reading position MRP (RH6: No), the control flow goes to a process RH7.

The CPU 30 increments the total line number TLN by "1" (RH7).

The CPU 30 sets the document flag OFG to off and stores it in the RAM 32 (RH8). The control flow goes to the process RH2 when the process RH8 ends.

When an affirmative determination (Yes) is made at the process RH5 or when an affirmative determination (Yes) is made at the process RH6, the CPU 30 stops the reading operation (RH9). Specifically, the CPU 30 sends a command to the drive circuit 37 and the unit controller 34 to stop the reading operation for reading the book document BGS and to stop driving the reading unit 20. The continuous side edge detection process RC5 ends when the process RH9 ends.

When a negative determination (No) is made at the process RH4, the CPU 30 executes the side edge detection process (RH10). The side edge detection process has been explained above in detail and is briefly explained here. The CPU 30 determines whether to detect any side edges LRE from the position at which the CPU 30 has detected the side edges LRE at the process RH3 toward the downstream side in the sub scanning direction SD until no side edges LRE are detected any more or until the total line number TLN becomes equal to the number of lines counted from the top line up to the maximum reading position MRP. The CPU 30 stops the reading operation when no side edges LRE are detected any more or when the total line number TLN becomes equal to the number of lines counted from the top line up to the maximum reading position MRP. The continuous side edge detection process RC5 ends when the process RH10 ends.

Advantageous Effects

At the processes RD1-RD6 in the side edge detection process RC1 that is executed at the document detection process R4, whether to detect any side edges LRE is determined until the document flag OFG becomes off or until the reading unit 20 reaches the maximum reading position MRP. At the process RE8 in the end determination process RC3, the maximum continuation line number MCLN is calculated. At the processes RH2-RH8 in the continuous side edge detection process RC5, it is determined whether the total line number TLN becomes equal to the maximum continuation line number MCLN, it is determined whether the reading unit 20 reaches the maximum reading position MRP, or it is determined whether the document flag OFG becomes on. The reading operation is stopped at the process RH9 when the total line number TLN becomes equal to the maximum continuation line number MCLN or when the reading unit 20 reaches the maximum reading position MRP. At the processes RD1-RD6 in the process RH10 that is executed when the document flag OFG is on, whether to detect any side edges LRE is determined until the document flag OFG becomes off or until the reading unit 20 reaches the maximum reading position MRP, and the reading operation is stopped at the process RD11 when the document flag OFG becomes off or when the reading unit 20 reaches the maximum reading position MRP. Thus, at the continuous side edge detection process RC5 executed after at least one side edge LRE has been detected at the side edge detection process RC1, the reading operation is stopped when the document flag OFG becomes off at the side edge detection process RH10 in the case where the document flag OFG becomes on before the total line number TLN becomes equal to the maximum continuation line number MCLN. Thus, the book document whose side edges LRE are not detected at its central bound portion can be appropriately read.

At the process RE1, the cover edge flag CEFG is set to on when the cover edge CE is present and to off when the cover edge CE is not present. At the process RES, the vertical book flag VBFG is set to on when the remaining distance in the sub scanning direction SDLD is "0" and to off when the remaining distance in the sub scanning direction SDLD is not "0". At the process RC3, the continuation flag CFG is set to off when the cover edge flag CEFG is on, when the total line number TLN is larger than the head width HW, when the horizontal book flag HBFG is on, or when the vertical book flag VBFG is on. At the process RC3, the continuation flag CFG is not set to off when the cover edge flag CEFG is off, the total line number TLN is smaller than or equal to the head width HW, the horizontal book flag HBFG is off, and the vertical book flag VBFG is off. At the process R4, the reading operation is again performed at the process RC5 when the continuation flag CFG is on while the reading operation is not performed when the continuation flag CFG is off. According to this configuration, the reading operation is not again performed in the case where a document other than the book document is read, thus enabling the reading operation to be ended at earlier timing.

Correspondence between Embodiment and Claims

The image reader SM, the document table DT, and the document cover CV are respectively one example of an image reader, one example of a document table, and one example of a document cover. The reading unit 20, the AFE 35, and the edge detector 39 are one example of a reading device. The CPU 30 is one example of a controller, and the flash ROM 33 is one example of a storage. The drive circuit 37, the conveyance motor MT, and the moving mechanism MM are one example of a moving device.

The process R2 is one example of a start process. The process R3 is one example of a head edge detection process. The process RC1 is one example of a first side edge detection process. The process RE8 is one example of a calculation process. The processes RH2-RH8 are one example of a second side edge detection process. The process RH10 is one example of a third side edge detection process. The process RH9 and the process RD11 in the process RH10 are one example of an end process. The process RG1 is one example of a width determination process. The process RD11 in the process RC1 is one example of an early-timing end process. The process RC3 is one example of an end control process. The process RA3 is one example of a corner detection process. The process RA7 is one example of a sub scanning distance calculation process. The process RG2 and the process RG3 are one example of a distance determination process. The process RE3 is one example of a document orientation determination process. The process RA6 is one example of an angle calculation process. The process RF1 is one example of a distance calculation process. The process RF2 is one example of a moving process. The process RF3 is one example of a cover edge determination process. The process RB1 is one example of a central area setting process. The process RB2 is one example of a head-edge-side central area determination process.

According to the above-described embodiment, even upon an occurrence, in a first side edge detection process, of a first change from a detecting state in which a side edge of a document is detected to a non-detecting state in which the side edge is not detected, the controller executes a second side edge detection process. Upon an occurrence of a second change from the non-detecting state to the detecting state in a continuation range in the second side edge detection process, a third side edge detection process is executed to determine whether to detect the side edge until an occurrence of the first change. Upon the occurrence of the first change in the third side edge detection process, the reading operation is ended. This control allows an image reader to appropriately read a book document (as shown in FIGS. 13A and 13B) whose side edges are not detected at its central bound portion.

According to the above-described embodiment, only the first side edge detection process is executed for a document not having a predetermined specific size, and the reading operation is ended relatively quickly without executing the second edge detection process and the third edge detection process.

According to the above-described embodiment, only the first side edge detection process is executed for a document having a first distance which coincides with a sub scanning distance, because the document is not a book document (as shown in FIGS. 13A and 13B) which floats, at its central bound portion, away from the document table. The first distance corresponds to the side edge end line number SELN, and the sub scanning distance corresponds to the book line number BLN. In this case, the reading operation is ended relatively quickly.

According to the above-described embodiment, a continuation distance is accurately calculated by doubling a difference between the sub scanning distance and the first distance. When the side edge of a document is not detected in the continuation range defined by the continuation distance in the second side edge detection process, the reading operation is ended relatively quickly because the document is not a book document (as shown in FIGS. 13A and 13B) which floats, at its central bound portion, away from the document table.

According to the above-described embodiment, only the first side edge detection process is executed for a document having the first distance which is larger than a document width corresponding to the head width HW because the document is not a book document (as shown in FIGS. 13A and 13B). In this case, the reading operation is ended relatively quickly.

According to the above-described embodiment, when line image data formed by reading an image of a document contains data indicative of a cover edge which is an edge of the document cover, only the first side edge detection process is executed because the document is a single sheet document but not a book document (as shown in FIGS. 13A and 13B). Thus, the reading operation is ended relatively quickly.

According to the above-described embodiment, when head area data formed by reading a head edge of a document is contained in read image data of a central area which corresponds to the central area CP, only the first edge detection process is executed because the document is a single sheet document but not a book document (as shown in FIGS. 13A and 13B). Thus, the reading operation is ended relatively quickly.

Modifications

It is to be understood that the disclosure is not limited to the details of the illustrated embodiment, but may be embodied with various changes and modifications without departing from the scope of the disclosure. Some modifications will be hereinafter described.

(1) The image reader SM of the illustrated embodiment is applicable to a multi-function peripheral (MFP) equipped with a printer. In the illustrated embodiment, the reading unit 20 is constituted by the CIS. The reading unit 20 may be constituted by a CCD unit including a charge coupled device (CCD) and movable in the sub scanning direction. Alternatively, the reading unit 20 may be constituted by a reading unit in which the CCD elements are fixed and the light source and a mirror are movable in the sub scanning direction.

(2) In the illustrated embodiment, the maximum continuation line number MCLN is calculated as follows. The difference between: the book line number BLN obtained by multiplying the head width HW by the predetermined ratio PDR; and the side edge end line number SELN is doubled, and the side edge end line number SELN is added to the doubled value, so as to obtain the maximum continuation line number MCLN. The maximum continuation line number MCLN may be calculated otherwise. For instance, the lengths of the book document BGS in the short-side direction and the long-side direction are stored in advance, and the book line number BLN may be calculated by calculating the ratio between the stored length in the short-side direction and the stored length in the long-side direction. A difference between the calculated book line number BLN and the side edge end line number SELN is doubled, and the side edge end line number SELN is added to the doubled value. The maximum continuation line number MCLN may be thus calculated. In this instance, the doubled value of the difference between the book line number BLN and the side edge end line number SELN corresponds to a distance to be read continuously at the continuous side edge detection process RCS.

(3) In the illustrated embodiment, the specific size SPS and the main scanning distance MDL are stored in the flash ROM 33 in association with each other. The present disclosure is not limited to this configuration. By reading a cover of the book document BGS immediately before the reading operation is performed, for instance, the lengths of the book document BGS in the long-side direction and the short-side direction may be obtained before the reading operation is performed.

What is claimed is:

1. An image reader, comprising:
    a document table configured to support a document;
    a reading device configured to read an image of the document supported by the document table by a line image sensor extending in a main scanning direction and to form read image data including a plurality sets of line image data respectively for a plurality of lines;
    a moving device configured to move the line image sensor in a sub scanning direction orthogonal to the main scanning direction; and
    a controller,
    wherein the controller is configured to execute:
        a start process of starting a reading operation to form the read image data while moving, by the moving device, the line image sensor downstream in the sub scanning direction;
        a head edge detection process of detecting, from the read image data, a document width which is a length in the main scanning direction of the document supported by the document table;
        a first side edge detection process of detecting, from the line image data for each line in the read image data, a side edge which is a side of the document along the sub scanning direction, by successively determining for each of the lines whether the line image data of one line contains data indicative of the side edge until an occurrence of a first change that is a change from a detecting state in which the side edge is detected to a non-detecting state in which the side edge is not detected;
        a calculation process of calculating a continuation distance based on the document width;
        a second side edge detection process of detecting the side edge from the line image data for each line in the read image data after the side edge is detected in the first side edge detection process, by successively determining for each of the lines whether the line image data of one line contains data indicative of the side edge until an occurrence of a second change that is a change from the non-detecting state to the detecting state in a continuation range ranging from a first position in the sub scanning direction at which the first change occurs in the first side edge detection process to a position distant from the first position downstream in the sub scanning direction by the continuation distance;
        a third side edge detection process of detecting the side edge from the line image data for each line in the read image data when the second change occurs in the second side edge detection process, by successively determining for each of the lines whether the line image data of one line contains data indicative of the side edge from a second position in the sub scanning direction at which the second change occurs in the second side edge detection process until an occurrence of the first change; and
        an end process of ending the reading operation when the second change does not occur in the continuation range in the second side edge detection process or when the first change occurs in the third side edge detection process.

2. The image reader according to claim 1, further comprising a storage configured to store a main scanning distance which is a length in the main scanning direction of a specific document having a predetermined size,
    wherein the controller is configured to execute:
        a width determination process of determining whether the document width coincides with the main scanning distance;
        an early-timing end process of ending the reading operation when the first change occurs in the first side edge detection process; and
        an end control process in which the controller ends the reading operation by the early-timing end process without executing the calculation process, the second side edge detection process, the third side edge detection process, and the end process when the document width does not coincide with the main scanning distance in the width determination process and in which the controller executes the calculation process, the second side edge detection process, the third side edge detection process, and the end process when the document width coincides with the main scanning distance in the width determination process.

3. The image reader according to claim 2, wherein the head edge detection process includes:
   a corner detection process of detecting positions of two of four corners of the document located upstream in the sub scanning direction; and
   a sub scanning distance calculation process of calculating a sub scanning distance by multiplying the document width by a ratio obtained by dividing a length of the specific document in the sub scanning direction by the main scanning distance,
wherein the controller is configured to execute a distance determination process of determining whether a first distance coincides with the sub scanning distance, the first distance being a distance between i) a mid-point of the positions of the two corners and ii) a intersecting point of a straight line along the sub scanning direction that includes the mid-point and a straight line along the main scanning direction that includes the first position, and
wherein the controller is configured to:
   in the end control process, end the reading operation by the early-timing end process without executing the calculation process, the second side edge detection process, the third side edge detection process, and the end process when the sub scanning distance and the first distance coincide with each other in the distance determination process, and
   in the end control process, execute the calculation process, the second side edge detection process, the third side edge detection process, and the end process when the document width and the main scanning distance coincide with each other in the width determination process and the sub scanning distance and the first distance do not coincide with each other in the distance determination process.

4. The image reader according to claim 3, wherein, in the calculation process, the controller calculates, as the continuation distance, a distance obtained by doubling a difference between the sub scanning distance and the first distance.

5. The image reader according to claim 3,
wherein the controller is configured to execute a document orientation determination process of determining whether the first distance is larger than the document width, and
wherein the controller is configured to:
   in the end control process, end the reading operation by the early-timing end process without executing the calculation process, the second side edge detection process, the third side edge detection process, and the end process when the first distance is larger than the document width in the document orientation determination process; and
   in the end control process, execute the calculation process, the second side edge detection process, the third side edge detection process, and the end process when the document width coincides with the main scanning distance in the width determination process, the sub scanning distance does not coincide with the first distance in the distance determination process, and the first distance is smaller than or equal to the document width in the document orientation determination process.

6. The image reader according to claim 3, further comprising a document cover configured to press the document supported by the document table,
wherein the head edge detection process includes an angle calculation process of calculating an inclination angle which is inclination of the document based on a straight line connecting the positions of the two corners, and
wherein the controller is configured to execute:
   a distance calculation process of calculating a detecting distance by multiplying a tangent of the inclination angle by the document width;
   a moving process of moving the line image sensor downstream in the sub scanning direction from the first position to a detecting position distant from the first position by the detecting distance; and
   a cover edge determination process of determining whether the line image data formed when the line image sensor is located at the detecting position contains data indicative of a cover edge which is an edge of the document cover,
wherein the controller is configured to:
   in the end control process, end the reading operation by the early-timing end process without executing the calculation process, the second side edge detection process, the third side edge detection process, and the end process when the line image data contains the data indicative of the cover edge in the cover edge detection process; and
   in the end control process, execute the calculation process, the second side edge detection process, the third side edge detection process, and the end process when the document width coincides with the main scanning distance in the width determination process, the sub scanning distance does not coincide with the first distance in the distance determination process, and the line data does not contain the data indicative of the cover edge in the cover edge determination process.

7. The image reader according to claim 3,
wherein the head edge detection process includes:
   a central area setting process of setting, as a central area, an area spreading over a predetermined range in the main scanning direction and the sub scanning direction with the mid-point of the two corners centered; and
   a head-edge-side central area determination process of determining whether head area data is contained in the read image data of the central area, the head area data being formed by reading a head edge which is a side of the document including the two corners and extending in the main scanning direction, and
wherein the controller is configured to:
   in the end control process, end the reading operation by the early-timing end process without executing the calculation process, the second side edge detection process, the third side edge detection process, and the end process when it is determined in the head-edge-side central area determination process that the head area data is not contained, and
   in the end control process, execute the calculation process, the second side edge detection process, the third side edge detection process, and the end process when the document width coincides with the main scanning distance in the width determination process, the sub scanning distance does not coincide with the first distance in the distance determination process, and it is determined in the head-edge-side central area determination process that the head area data is contained.

* * * * *